Patented Dec. 5, 1933

1,938,044

UNITED STATES PATENT OFFICE 1,938,044

PROCESS OF PREPARING ESTERS OF THE CARBOHYDRATES

Albrecht Schmidt, Frankfort-on-the-Main, and Gerhard Balle and Hans Lange, Frankfort-on-the-Main-Hochst, Germany, assignors to I. G. Farbenindustrie Aktiengesellschaft, Frankfort-on-the-Main, Germany No Drawing. Application December 18, 1929, Serial No. 415,119, and in Germany December 20, 1928

12 Claims. (Cl. 260—101)

The present invention relates to a process of preparing esters of the carbohydrates.

We have found that cellulose esters can be prepared in a particularly easy and uniform manner while using liquid sulfur dioxide as a solvent or a diluent by causing the reaction to take place in the presence of a limited quantity of a soluble inorganic oxidizing agent which will form sulfuric acid or soluble acid reacting sulphates.

By the action of nascent oxygen upon the sulfur dioxide the oxidizing agents produce in the reaction mixture limited quantities of sulfur trioxide or of sulfuric acid, which can easily be measured, that is to say products which have hitherto successfully been used as catalysts or condensing agents. It has proved to be particularly suitable to use or to use inter alia a metallic oxide capable of parting with oxygen such as, for instance, chromic anhydride. In this reaction the formation of sulfur trioxide or of sulfuric acid may be followed by their further transformation into acid or neutral metallic sulfates. Secondary substances are thus obtained which, as is known, are likewise well appropriate to promote the course of the esterification. Besides, when using a metallic oxide, it is possible to prevent to any degree an undesired hydrolysis as well as any decomposition of the cellulose or of the derivatives thereof in consequence of the neutralization of the sulfuric acid by the metallic oxide.

The quantities of oxidizing agents to be used may vary within wide limits and they are applied proportionally to the cellulose starting material, to the acidylating agents and to the temperature. The cellulose may be used in any desired form either as linters, wood cellulose, or artificial silk waste or in the form of their transformation products. Suitable acidylating agents are: acid anhydrides, acid halides, free acids and the mixtures thereof. The duration of the transformation, the temperatures, the pressure and the quantity of the sulfuric acid produced by the oxidizing agents to be applied may vary within wide limits. By suitably selecting and combining the reaction components, the oxidizing agents and the conditions of transformation the solubility and viscosity of the cellulose esters can be considerably varied according to the different applications to which the esters are intended to be put, so that the special requirements in this respect can be met. The esterification may also be followed by an after-treatment with known hydrolizing agents. Thus, for instance, when manufacturing pure cellulose acetates the technically important acetone-soluble cellulose acetate can be obtained by adding limited quantities of water to the primary reaction mixture and intimately mixing the mass for several hours at a temperature of 30° C.–80° C.

When working up the cellulose esters manufactured in liquid sulfur dioxide by means of oxidizing agents the reaction mixture may be introduced into one of the known precipitants, such, for instance, as water, and sulfur dioxide may continuously be distilled, or the sulfur dioxide may be distilled before precipitation. Finally the reaction products may be worked up directly into threads or films.

The following examples illustrate the invention, but they are not intended to limit it thereto, the parts being by weight:

(1) 160 parts of cotton linters, 400 parts of acetic anhydride and 4 parts of chromic anhydride are intimately mixed in a pressure vessel during 4–7 hours at a temperature of 35° C.– 45° C. with 800–1000 parts of liquid sulfur dioxide. Then about 15 parts of water and finally at 30° C.-50° C. 20–50 parts of water are introduced and the mixture is subsequently stirred until a test precipitated with water is clearly soluble in acetone. The reaction mass is then introduced into water, while stirring, at which operation the cellulose acetate precipitates in flakes and the sulfur dioxide is simultaneously eliminated by distillation. The cellulose acetate is washed and dried in the usual manner.

(2) 100 parts of air-dry linters are digested during 10–20 hours, at 40–50° C., with 400 parts of acetic anhydride, 700 parts of sulfur dioxide and 3.5 parts of chromic anhydride. After the sulfur dioxide has been distilled off the residual tri-acetate may by an after-treatment with a hydrolizing agent be transformed into an acetate soluble in acetone.

(3) 100 parts of air-dry cellulose, 150 parts of butyric acid, 250 parts of acetic anhydride, 600 parts of sulfur dioxide and 3–5 parts of potassium permanganate are kneaded during 15–20 hours at a temperature slowly decreasing from 50–20° C. The product obtained is a cellulose butyro-acetate soluble in acetone.

(4) 100 parts of cellulose are stirred in a pressure vessel during 20 hours at 50° C. with 100 parts of butyric anhydride, 250 parts of acetic anhydride, 600 parts of sulfur dioxide and 3–5 parts of hydrogen peroxide of 30 per cent strength. After the sulfur dioxide has been distilled off the product is washed with water. It is a cellulose-butyro-acetate primarily soluble in acetone.

(5) 180 parts of methyl starch, 90 parts of isobutyric acid and 2 parts of chromic anhydride are thoroughly stirred during 3-4 hours at 30-50° C. in 800 parts of liquid sulfur dioxide. The liquid reaction mass is then introduced into water, while stirring. The methyl starch-isobutyrate precipitates in the form of white flakes which are insoluble in water, while the sulfur dioxide is continuously distilled off. The product which precipitates is washed and dried in the usual manner.

We claim:

1. The process of preparing an ester of a carbohydrate which comprises treating the carbohydrate to be esterified with an esterifying bath containing liquid sulfur dioxide and a soluble inorganic oxidizing agent which will form sulfuric acid or soluble acid reacting sulphates with the sulfur dioxide.

2. The process of preparing an ester of a carbohydrate which comprises treating the carbohydrate to be esterified with an esterifying bath containing liquid sulfur dioxide and chromic anhydride.

3. The process of preparing a cellulose ester which comprises treating the cellulose to be esterified with an esterifying bath containing liquid sulfur dioxide and a soluble inorganic oxidizing agent which will form sulfuric acid or soluble acid reacting sulphates with the sulfur dioxide.

4. The process of preparing a cellulose ester which comprises treating the cellulose to be esterified with an esterifying bath containing liquid sulfur dioxide and chromic anhydride.

5. The process of preparing cellulose acetate which comprises treating the cellulose to be acetylated with an acetylating bath containing liquid sulfur dioxide and a soluble inorganic oxidizing agent which will form sulfuric acid or soluble acid reacting sulphates with the sulfur dioxide.

6. The process of preparing cellulose acetate which comprises treating the cellulose to be acetylated with an acetylating bath containing liquid sulfur dioxide and chromic anhydride.

7. The process of preparing an ester of a carbohydrate which comprises treating the carbohydrate to be esterified with an esterifying bath containing liquid sulfur dioxide and potassium permanganate.

8. The process of preparing an ester of a carbohydrate which comprises treating the carbohydrate to be esterified with an esterifying bath containing liquid sulfur dioxide and hydrogen peroxide.

9. The process of preparing a cellulose ester which comprises treating the cellulose to be esterified with an esterifying bath containing liquid sulfur dioxide and potassium permanganate.

10. The process of preparing a cellulose ester which comprises treating the cellulose to be esterified with an esterifying bath containing liquid sulfur dioxide and hydrogen peroxide.

11. The process of preparing cellulose acetate which comprises treating the cellulose to be acetylated with an acetylating bath containing liquid sulfur dioxide and potassium permanganate.

12. The process of preparing cellulose acetate which comprises treating the cellulose to be acetylated with an acetylating bath containing liquid sulfur dioxide and hydrogen peroxide.

ALBRECHT SCHMIDT.
GERHARD BALLE.
HANS LANGE.